(12) United States Patent
Bendahan

(10) Patent No.: US 7,492,862 B2
(45) Date of Patent: Feb. 17, 2009

(54) COMPUTED TOMOGRAPHY CARGO INSPECTION SYSTEM AND METHOD

(75) Inventor: Joseph Bendahan, San Jose, CA (US)

(73) Assignee: GE Homeland Protection, Inc., Newark, CA (US)

( * ) Notice: Subject to any disclaimer, the term of this patent is extended or adjusted under 35 U.S.C. 154(b) by 0 days.

(21) Appl. No.: 11/654,251

(22) Filed: Jan. 17, 2007

(65) Prior Publication Data

US 2008/0170655 A1 Jul. 17, 2008

(51) Int. Cl.
*G01N 23/04* (2006.01)
(52) U.S. Cl. .................... 378/57; 378/20; 378/195
(58) Field of Classification Search .............. 378/57, 378/4–20, 193–197
See application file for complete search history.

(56) References Cited

U.S. PATENT DOCUMENTS

| | | | |
|---|---|---|---|
| 3,919,467 A | 11/1975 | Peugeot | 378/98.2 |
| 4,216,499 A | 8/1980 | Kunze et al. | 378/98.2 |
| 4,422,177 A * | 12/1983 | Mastronardi et al. | 378/17 |
| 4,769,830 A | 9/1988 | Peterson et al. | |
| 4,963,746 A | 10/1990 | Morgan et al. | |
| 5,164,971 A | 11/1992 | Peyret et al. | |
| 5,293,414 A | 3/1994 | Ettinger et al. | |
| 5,600,303 A | 2/1997 | Husseiny et al. | 340/568.1 |
| 5,692,029 A | 11/1997 | Husseiny et al. | 378/88 |
| 5,838,758 A | 11/1998 | Krug et al. | 378/53 |
| 5,838,759 A | 11/1998 | Armistead | 378/57 |
| 5,958,299 A | 9/1999 | Kury et al. | |
| 6,122,344 A | 9/2000 | Beevor | 378/88 |
| 6,151,381 A | 11/2000 | Grodzins et al. | |
| 6,198,790 B1 | 3/2001 | Pflaum | |
| 6,358,377 B1 | 3/2002 | Schloremberg et al. | |
| 6,553,094 B1 | 4/2003 | Bernardi et al. | |
| 6,567,496 B1 | 5/2003 | Sychev | 378/57 |
| 6,584,170 B2 | 6/2003 | Aust et al. | |
| 6,628,745 B1 | 9/2003 | Annis et al. | |
| 6,687,328 B2 | 2/2004 | Bavendiek et al. | |
| 6,693,988 B2 | 2/2004 | Harding | 378/86 |
| 6,827,489 B2 | 12/2004 | Nicolas et al. | |
| 6,891,919 B2 | 5/2005 | Kresse et al. | 378/19 |
| 6,898,263 B2 | 5/2005 | Avinash et al. | |
| 6,987,833 B2 | 1/2006 | Du et al. | |
| 7,016,459 B2 | 3/2006 | Ellenbogen et al. | 378/19 |
| 7,039,154 B1 | 5/2006 | Ellenbogen et al. | 378/19 |
| 7,050,536 B1 | 5/2006 | Fenkart et al. | 378/57 |
| 7,062,011 B1 | 6/2006 | Tybinkowski et al. | 378/57 |
| 7,092,485 B2 | 8/2006 | Kravis | 378/57 |
| 7,103,137 B2 | 9/2006 | Seppi et al. | 378/9 |
| 7,116,751 B2 | 10/2006 | Ellenbogen et al. | 378/57 |
| 7,123,681 B2 | 10/2006 | Ellenbogen et al. | 378/19 |
| 7,133,491 B2 | 11/2006 | Bernardi et al. | 378/57 |

(Continued)

*Primary Examiner*—Courtney Thomas
(74) *Attorney, Agent, or Firm*—Eugene Hyun, Esq.; Armstrong Teasdale LLP

(57) ABSTRACT

An X-ray computed tomography scanning system for inspecting an object includes a platform configured to support the object. The platform is rotatable about an axis and movable in a direction parallel to the axis. At least one X-ray source is fixedly positioned with respect to the platform and configured to transmit radiation through the object. At least one X-ray detector is fixedly positioned with respect to the platform. The at least one X-ray detector is configured to detect the radiation transmitted through the object and generate a signal representative of the detected radiation.

36 Claims, 2 Drawing Sheets

U.S. PATENT DOCUMENTS

| | | |
|---|---|---|
| 7,164,747 B2 | 1/2007 | Ellenbogen et al. ........... 378/19 |
| 2002/0037068 A1 | 3/2002 | Oikawa |
| 2003/0031300 A1 | 2/2003 | Cheng |
| 2003/0128807 A1 | 7/2003 | Kotler et al. |
| 2004/0017888 A1 | 1/2004 | Seppi et al. |
| 2004/0109532 A1 * | 6/2004 | Ford et al. .................... 378/57 |

* cited by examiner

COMPUTED TOMOGRAPHY CARGO INSPECTION SYSTEM AND METHOD

BACKGROUND OF THE INVENTION

This invention relates generally to cargo inspection systems and, more particularly, to cargo inspection systems incorporating computed tomography (CT) to inspect cargo for contraband and methods for operating the same.

Since the events of Sep. 11, 2001, the Department of Homeland Security has increased security dramatically in U.S. airports. Such security efforts include screening passengers and carry-on bags and luggage for contraband including explosive materials.

Many of these systems employ single or few multi-view x-ray transmission technology. Although, these systems enable the detection of weapons and blades, for example, they lack the capability of detecting explosives with a low false alarm rate.

CT provides a quantitative measure of material characteristics, regardless of location or the superposition of objects; a substantial advantage over conventional and multi-view x-ray transmission and radioisotope-based imaging systems. In a CT scanner, a large number of precise x-ray "views" are obtained at multiple angles. These views are then used to reconstruct planar or volumetric images. The image is a mapping of the x-ray mass attenuation value for each volume element (or voxel) within the imaged volume.

Systems employing CT are widely employed in airports around the world in checked luggage to detect explosives that pose a threat to aviation safety. These systems employ an x-ray source and opposing detectors that rotate around a horizontal axis while the suitcase is translated along the same horizontal axis.

While such screening processes are also reliable and suitable for break-bulk cargo, there is a need for inspecting large crates, pallets and containers too large to inspect with conventional checked-luggage scanning systems. Further, it is too time consuming to remove and inspect the contents of each cargo container before loading the container for delivery to the destination. Only a portion of air cargo containers are inspected using currently available technologies including manual inspection, canine inspection and/or trace detection. It is recognized that these inspection methods must be improved for automation and/or to obtain greater detection.

Computed Tomography for objects larger than checked luggage requires a high-energy x-ray generator to penetrate the more attenuating objects and a large array of high-energy detectors to cover the large objects and detect the higher energy of the radiation.

Systems employing these principles are in use for Non-Destructive Testing (NDT) of machine parts, jet engines and rockets, for example. These systems are tailored for NDT applications with characteristics not suitable for contraband inspections. In addition, the scanning and image reconstruction processes are very slow.

A CT scanning system has been described that includes a rotatable table that supports a container and an x-ray source and an opposing x-ray detector that are movable parallel to the rotational axis of the table to scan cargo containers for the detection of explosives and other contraband.

BRIEF DESCRIPTION OF THE INVENTION

In one aspect, an X-ray computed tomography scanning system is provided for inspecting an object. The X-ray computed tomography scanning system includes a platform configured to support the object. The platform is rotatable about an axis and movable in a direction parallel to the axis. At least one X-ray source is fixedly positioned with respect to the platform and configured to transmit radiation through the object. At least one X-ray detector is fixedly positioned with respect to the platform. The at least one X-ray detector is configured to detect the radiation transmitted through the object and generate a signal representative of the detected radiation.

In another aspect, a method is provided for inspecting a container for contraband. The method includes positioning the container on a platform configured to support the container. The platform is rotatable about an axis and movable in a direction parallel to the axis. X-ray beams are produced having at least one energy distribution and transmitted through the container as the container rotates about the axis and moves in a direction parallel to the axis. The X-rays transmitted through the container are detected with an array of detectors that generate signals representative of the detected radiation. The signals are processed to produce images of the container and its contents to generate a map for the container including at least one of a CT number, a density and an atomic number corresponding to the contents within the container.

In another aspect, a method is provided for X-ray computed tomography scanning a container supported on a platform for inspecting contents of the container. The method includes providing a base defining a first axis and a frame movably coupled to the base. The frame moves with respect to the base in a direction parallel to the first axis. The platform coupled to the frame rotates with respect to the frame about the first axis. An X-ray beam is emitted from at least one X-ray source fixedly positioned with respect to the platform and transmitted through the container. The transmitted X-ray beam is detected by at least one X-ray detector fixedly positioned with respect to the platform.

In another aspect, an X-ray computed tomography scanning system is provided. The X-ray computed tomography scanning system includes a platform configured to support an object. At least one X-ray source is positioned with respect to the platform and is configured to transmit radiation through the object and induce fission of a fissile material within the object. At least one neutron and gamma-ray detector positioned with respect to the platform is configured to detect radiation produced as a result of fission. The at least one neutron and gamma-ray detector is further configured to generate a signal representative of detected radiation. A data collection system is operatively coupled to the at least one neutron and gamma-ray detector. The data collection system is configured to detect a presence of fissile material based at least partially on the generated signal.

In another aspect, an X-ray computed tomography scanning system is provided. The X-ray computed tomography scanning system includes a platform configured to support an object. At least one neutron and gamma-ray detector is positioned with respect to the platform. The at least one neutron and gamma-ray detector is configured to passively detect a presence of radioactive material and to generate a signal representative of detected radiation. A data collection system is operatively coupled to the at least one neutron and gamma-ray detector. The data collection system is configured to detect a presence of radioactive material based at least partially on the generated signal.

DETAILED DESCRIPTION OF THE INVENTION

The present invention provides a system and method for effectively inspecting cargo for the presence of contraband including, without limitation, explosive material, nuclear material and/or shielding material. In one embodiment, an X-ray computed tomography (CT) scanning system is utilized for facilitating inspecting cargo for contraband. The present invention employs an X-ray CT scanning system having system characteristics, such as spatial resolution, penetration, scanning and/or reconstruction speeds that can be tailored for the detection of explosives, nuclear material and/or other contraband. In a particular embodiment, the scanning system may include localized shielding to minimize facility requirements and/or a conveyor or other suitable transport mechanism operatively coupled to the scanning system to facilitate moving the cargo through the scanning system.

The system and method provide a three dimensional image of the object to map a density and/or an atomic number of the object being inspected. This information is employed to infer automatically (without user intervention) the presence of explosive material, nuclear material and/or shielding material. Further, such information can also be used for visual inspection and/or determination of a type of contraband within the object. Alternatively or in addition, user inspection/on-screen resolution can also be incorporated to detect or confirm a presence of explosive material, nuclear material and/or other contraband and for cargo manifest verification. The system's spatial resolution facilitates detecting small explosives that pose a threat to aviation security while also detecting nuclear material and/or shielding material. The system is also capable of detecting fissile material and detecting unshielded or partially shielded radioactive material.

The present invention is described below in reference to its application in connection with and operation of a system for inspecting cargo crates, pallets and/or containers. However, it will be apparent to those skilled in the art and guided by the teachings herein provided that the invention is likewise applicable to any suitable system for scanning containers including, without limitation, boxes, drums and luggage, transported by water, land and/or air, as well as other containers and/or objects. Further, although the present invention is described below in reference to its application in connection with and operation of a system incorporating an X-ray computed tomography scanning system for inspecting cargo crates, pallets and/or containers, it is apparent to those skilled in the art and guided by the teachings herein provided that any suitable radiation source including, without limitation, neutrons or a gamma rays may be used in alternative embodiments.

Figure 1:
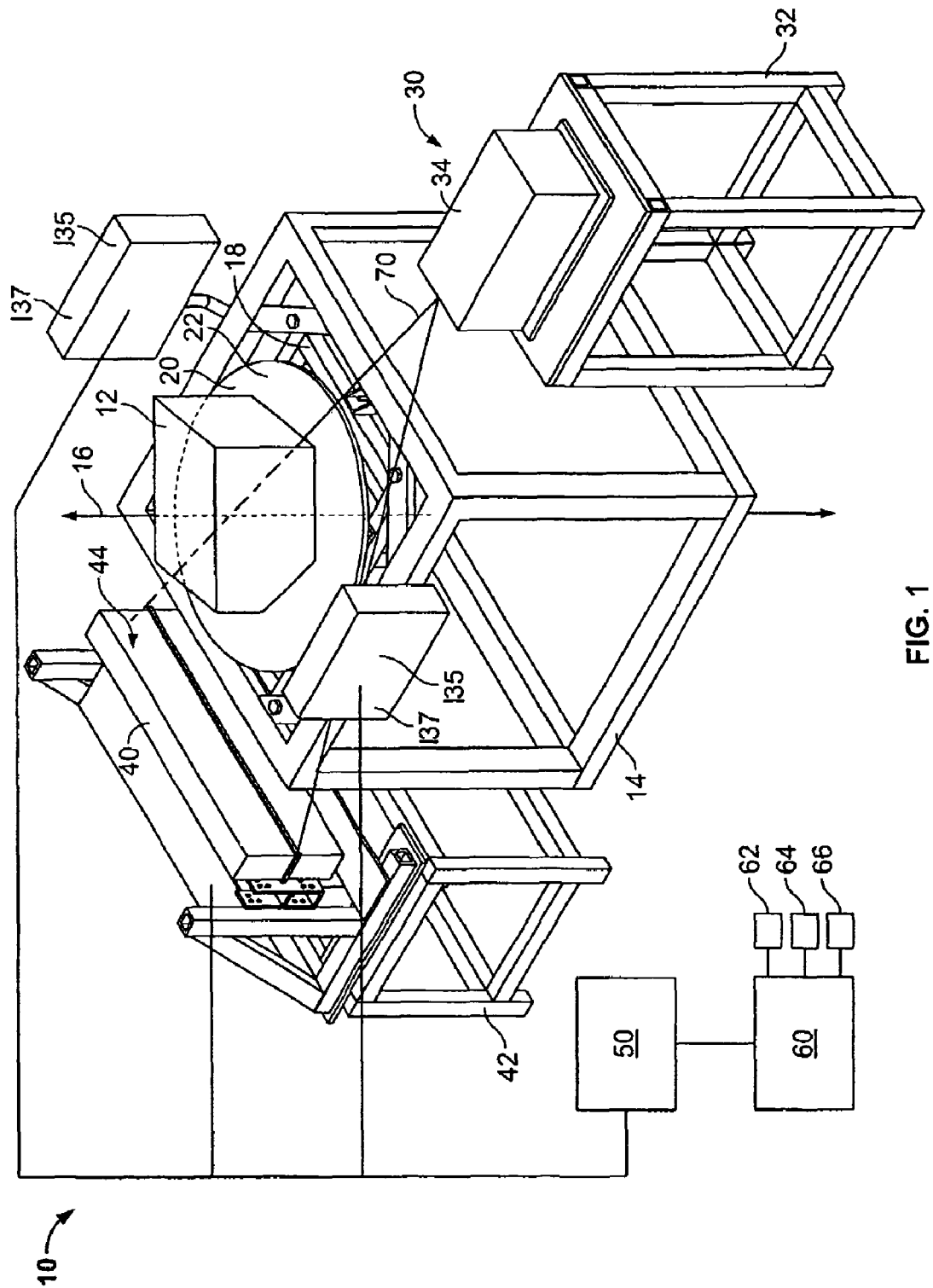
FIG. 1 is a perspective view of an exemplary X-ray computed tomography (CT) scanning system.
Figure 2:
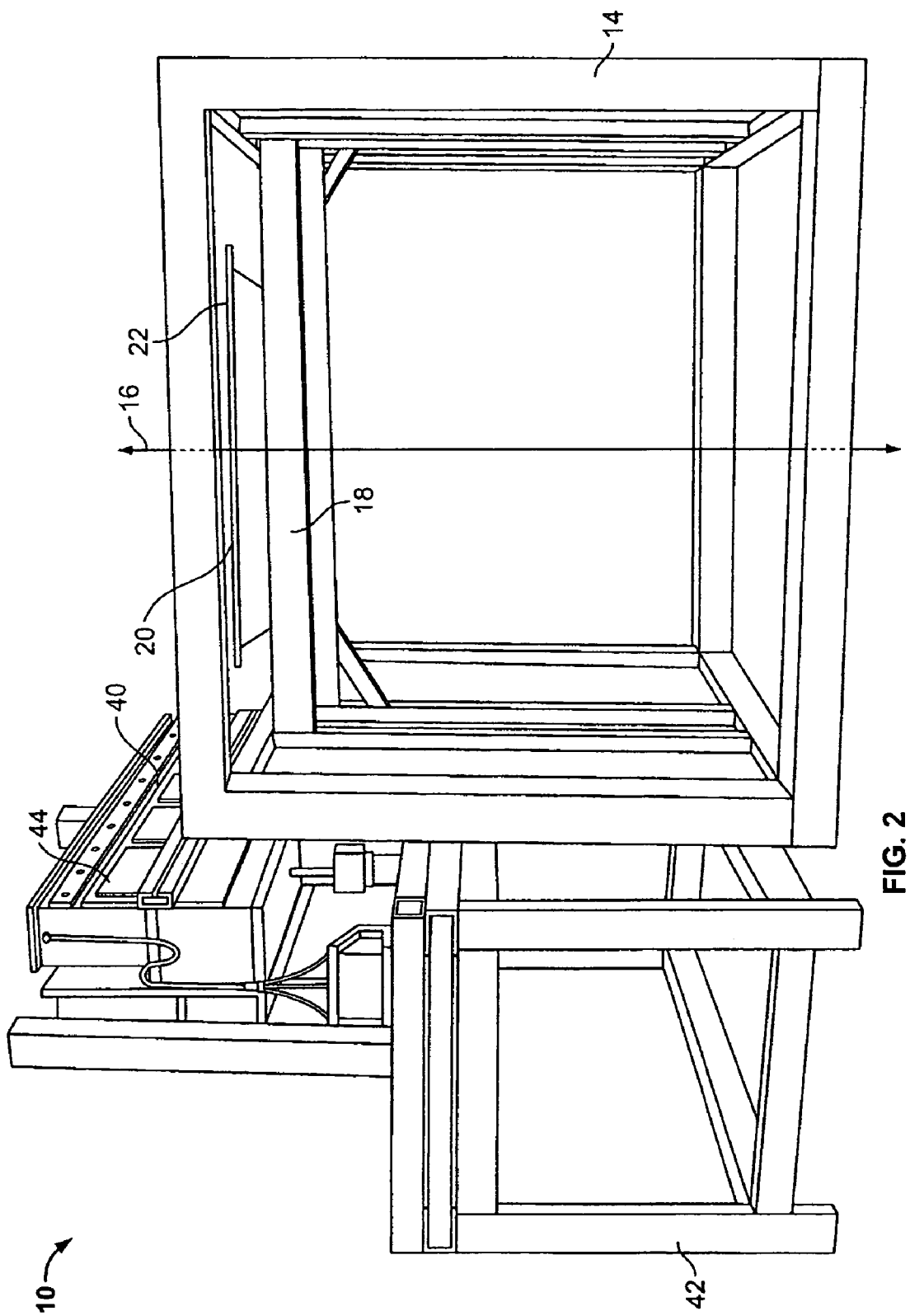
FIG. 2 is a perspective view of a portion of the X-ray computed tomography (CT) scanning system shown in FIG. 1.

FIG. 1 is a perspective view of an X-ray computed tomography (CT) scanning system 10 for scanning an object, such as a cargo container 12, box or drum, to identify the contents and/or determine the type of material contained within container 12. FIG. 2 is a perspective view of a portion of system 10 shown in FIG. 1. The term "contents" as used herein refers to any object and/or material contained within container 12 and may include contraband. System 10 includes a base 14 defining a first axis 16. As shown in FIGS. 1 and 2, first axis 16 defines a vertical axis. Base 14 is fabricated of a suitable material that provides sufficient support for the system components and the objects positioned on system 10. A frame 18 is movably coupled to base 14. Frame 18 is movable with respect to base 14 in at least one direction. In one embodiment, frame 18 is movable with respect to base 14 in a direction parallel to first axis 16, e.g., in an upward direction and a downward direction.

System 10 further includes a platform 20 that is rotatably coupled to frame 18. Platform 20 is movable with frame 18 and rotatable with respect to frame 18. In one embodiment, platform 20 is rotatable with respect to frame 18 about first axis 16 in a clockwise or counterclockwise rotational direction and movable with frame 18 with respect to base 14 in an upward direction and a downward direction parallel to first axis 16. As shown in FIGS. 1 and 2, platform 20 forms a surface 22 for supporting container 12.

System 10 includes at least one X-ray source 30, such as a megavolt X-ray generator, fixedly positioned with respect to frame 18 and/or platform 20. In a particular embodiment, X-ray source 30 is fixedly positioned with respect to a first side of frame 18 and/or platform 20. As shown in FIG. 1, X-ray source 30 is mounted to a first tower 32 positioned with respect to base 14. Each X-ray source 30 is configured to transmit at least one beam of radiation, such as a cone beam, through container 12, as described in greater detail below. In one embodiment, a plurality of X-ray sources 30 are fixedly positioned with respect to platform 20 and configured to emit radiation of different energy distributions. Alternatively, each X-ray source 30 is configured to emit radiation of selective energy distributions, which can be emitted at different times. In a particular embodiment, system 10 utilizes multiple energy inspection to obtain an attenuation map for container 12. In a multiple energy system, such as a dual energy system, a first or low energy source generates radiation having an energy distribution of about 2 MV to about 6 MV and a second or high energy source generates radiation having an energy distribution of about 6 MV to about 20MV. It is apparent to those skilled in the art and guided by the teachings herein provided that the first energy source may generate radiation having an energy distribution less than about 2 MV and/or greater than about 6 MV and/or the second energy source may generate radiation having an energy distribution less than about 6MV and/or greater than about 20 MV.

In addition to the production of CT images, multiple-energy scanning enables the production of density maps and atomic number of the object contents. This information allows for an improved identification of the materials contained in container 12. For example, it allows for accurately distinguishing high-density tungsten from uranium. In one embodiment, the dual energy scanning of container 12 includes inspecting container 12 by scanning container 12 at the low energy and then scanning container 12 at the high-energy. The data is collected for the low-energy scan and the high-energy scan to reconstruct the CT, density and/or atomic number images of container 12 for facilitating identifying the type of material or contraband within container 12 based on the material content of container 12, as described in greater detail below.

In an alternative embodiment, X-ray source 30 includes a linear accelerator 34 for producing a pulsed X-ray source. In this embodiment, linear accelerator 34 generates the low energy x-rays and the high energy x-rays in a high speed switching mode or interlaced mode such that container 12 is scanned only one time. This approach allows for higher throughput. In further alternative embodiments, X-ray source 30 includes a suitable electrostatic accelerator, a microtron or a betatron or any other type of X-ray source.

In one embodiment, container 12 is scanned with at least one energy distribution. Following analysis of the images, suspicious areas are selected for a more detailed scan. Improved details are obtained with longer scanning times and/or improved spatial resolution.

At least one X-ray detector 40 is fixedly positioned with respect to frame 18 and/or platform 20. In one embodiment, X-ray detector 40 is fixedly positioned with respect to a second side of frame 18 and/or platform 20 opposing the platform first side. In a particular embodiment, X-ray detector 40 is mounted to a second tower 42 positioned with respect to base 14, as shown in FIG. 1. X-ray detector 40 is configured to detect radiation emitted from X-ray source 30 and transmitted through container 12. X-ray detector 40 is configured to cover an entire field of view or only a portion of the filed of view. Upon detection of the transmitted radiation, X-ray detector 40 generates a signal representative of the detected transmitted radiation. The signal is transmitted to a data collection system and/or processor as described below. In one embodiment, X-ray detector 40 includes a high-energy detector configured to cover container 12 partially or completely and detect radiation energy in an allotted time. In a particular embodiment, X-ray detector 40 includes an array or plurality of two dimensional detector elements to detect X-ray transmission through container 12. Upon detection of the transmitted radiation, each X-ray detector element generates a signal representative of the detected transmitted radiation. The signal is transmitted to a data collection system and/or processor as described below.

System 10 is utilized to reconstruct a CT image of container 12 positioned on surface 22 of platform 20 in real time or non-real or delayed time. In one embodiment, frame 18 is actuated to move with respect to base 14 in a direction parallel to first axis 16, e.g., in an upward direction or a downward direction along first axis 16. Any suitable drive assembly known to those skilled in the art and guided by the teachings herein provided may be operatively coupled to frame 18 to provide such actuation and movement with respect to base 14. As frame 18 moves with respect to base 14, platform 20 rotates with respect to frame 18 about first axis 16. In one embodiment, platform 20 rotates 360° in a first rotational direction with respect to frame 18. Alternatively, platform 20 only partially rotates with respect to frame 18. For example, in a particular alternative embodiment, platform 20 rotates in the first rotational direction about 270° and then reverses direction to rotate in an opposing second rotational direction about 270°. It should be apparent to those skilled in the art and guided by the teachings herein provided that platform 20 may rotate in either rotational direction and/or for any suitable degree of rotation to facilitate scanning container 12, as described in greater detail below. In a further alternative embodiment, container 12 is stationary as system 10 rotates about first axis 16 and/or moves with respect to container 12 parallel to first axis 16.

System 10 is configured to operate in a step-and-shoot mode and a helical mode. In the step-and-shoot mode, system 10 is positioned with respect to container 12 to be scanned, with or without the container rotating and without collecting data. With system 10 in proper position, the data is collected as container 12 is rotated. In one embodiment, container 12 is continuously rotated during the step-and-shot mode. Alternatively, in the helical mode, platform 20 is continuously rotated as frame 18 is translated to collect data.

One or more X-ray sources 30, mounted to first tower 32 and stationary with respect to platform 20, generate X-ray beams having one or more energy distributions. In one embodiment, X-ray source 30 includes a pulsed X-ray source including linear accelerator 34, which generates a low energy source and a high energy source in a high speed switching mode or interlaced mode such that container 12 is scanned only one time. In one embodiment, one or more collimators (not shown) are positioned between X-ray source 30 and container 12 to collimate the X-ray beam emitted from each X-ray source 30 into a suitable beam, such as a cone beam, to reduce excessive radiation that is not used in imaging container 12 and/or to minimize scattered radiation.

X-ray detector 40 detects radiation emitted from X-ray source 30 and transmitted through container 12. X-ray detector 40 generates a signal representative of the detected radiation. In one embodiment, one or more collimators (not shown) are positioned between container 12 and X-ray detector 40 for facilitating preventing or limiting scattered radiation energy from damaging X-ray detector 40.

System 10 facilitates obtaining a large number of precise X-ray views, which are then used to reconstruct a volumetric image of container 12. The image is a mapping of the CT number for each volume element regardless of the superposition of objects or materials within container 12. In one embodiment, an imaging system is coupled to X-ray detectors 40 to process the image data for producing a two-dimensional or three-dimensional map of the container and its contents. The reconstructed images are processed to determine a CT number, density and/or atomic number of container 12 being scanned. Analysis of these images facilitates determining the type of material contained within container 12, for example.

In one embodiment, a data collection system 50 is operatively coupled to and in signal communication with X-ray detector 40. Data collection system 50 is configured to receive the signals generated and transmitted by X-ray detector 40. A processor 60 is operatively coupled to data collection system 50. Processor 60 is configured to produce or generate an image of container 12 and its contents and process the produced image for facilitating determining the material content of container 12. More specifically, in one embodiment data collection system 50 and/or processor 60 produces at least one attenuation map based upon the signals received from X-ray detector 40. Utilizing the attenuation map(s), at least one image of the contents is reconstructed and a CT number, a density and/or an atomic number of the contents is inferred from the reconstructed image(s). When data is collected using a single energy mode, the CT image is analyzed. When data is collected using a multiple energy mode, two or more CT images of the cargo are produced. Based on these CT images, density and/or atomic maps of the cargo can be produced. The CT images, the density and/or atomic number images are analyzed to infer the presence of contraband such as explosives, special nuclear and shielding materials and/or to perform cargo manifest verification.

In alternative embodiments, one processor 60 or more than one processor 60 may be used to generate and/or process the container image. In one embodiment, system 10 also includes a display device 62, a memory device 64 and/or an input device 66 operatively coupled to data collection system 50 and/or processor 60.

As used herein, the term processor is not limited to only integrated circuits referred to in the art as a processor, but broadly refers to a computer, a microcontroller, a microcomputer, a programmable logic controller, an application specific integrated circuit and any other programmable circuit. The processor may also include a storage device and/or an input device, such as a mouse and/or a keyboard.

X-ray source 30 emits x-rays in an energy range, which is dependent on a voltage applied by a power source to X-ray source 30. A primary beam 70 shown in FIG. 1, such as a fan beam or cone beam, is generated. Primary beam 70 passes through container 12 positioned on platform 20 and X-ray detector 40, positioned on the opposing side of platform 20, measures an intensity of primary beam 70. In one embodiment, X-ray detector 40 measures the x-rays in an energy-sensitive manner by outputting a plurality of electrical output signals dependent on a plurality of energies of x-ray quanta detected from within primary beam 70.

In one embodiment, system 10 is configured to determine and/or confirm a presence of fissile material and/or passively detect the presence of radioactive materials in container 12. In conventional scanning systems, container 12 is moved to a second platform for conducting a fissile material and/or passive detection scan of container 12, if desired. Unlike conventional scanning systems, system 10 provides a reliable method for detecting and/or confirming a presence of fissile material in container 12 without rerouting or repositioning container 12. In a particular embodiment, a subsystem performs an active interrogation of container 12 with high energy X-rays, which induces fission in fissile material potentially contained within container 12, commonly referred to as photofission. Following photofission, decaying products emit delayed gamma rays and/or delayed neutrons, which provide a characteristics signature for a particular fissile material. In an alternative embodiment, the system detects the increased number of prompt neutrons to infer the presence of fissile materials. System 10 is configured to analyze any characteristics signature produced during the scanning process to determine the presence of fissile material contained within container 12. The system and/or subsystem as described herein may be utilized in cooperation with any suitable CT scanning system for detecting and/or confirming a presence of fissile material in an object, such as a container.

At least one neutron detector 135 and at least one gamma-ray detector 137 are positioned with respect to platform 20. In one embodiment, neutron detector 135 and gamma-ray detector 137 are configured to detect radiation resulting from fission of a fissile material. The fission is induced by a beam with an energy distribution produced by X-ray source 30. This energy distribution may be the same or similar to the energy distribution utilized during the CT scanning process. Alternatively, this energy distribution may be different than the energy distribution utilized during the CT scanning process. Further, the photofission process may take place simultaneously with the CT scanning process or separately. For example, a separate scan during the photofission process may be performed if suspicious cargo or an area of concern is detected, or a threat of fissile material within container 12 is suspected.

During the photofission process, neutron detector 135 and gamma-ray detector 137 generate at least one signal representative of detected radiation resulting from the fission of the fissile material. A data collection system and/or a processor, as described below, are operatively coupled to neutron detector 135 and gamma-ray detector 137 to receive the generated signal(s) and detect and/or confirm a presence of fissile material.

In a further embodiment, neutron detector 135 and gamma-ray detector 137 are utilized for detecting passively the presence of radioactive materials. The passive detection can proceed while container 12 rotates to minimize the time to obtain the required statistical accuracy.

In one embodiment, X-ray source 30 includes a Bremsstrahlung source for generating radiation having a high energy distribution, such as an energy distribution greater than about 1 MV. System 10 can be retrofitted with fissile material confirmation capability based on differential die-away or detection of delayed radiation induced by photofission. Further, the subsystem can be used to perform passive inspection. In one embodiment, neutron detector 135 and gamma-ray detector 137 are configured to perform a passive scan of container 12 to detect radioactive materials.

The above-described system and method facilitates inspecting cargo containers efficiently and reliably. More specifically, the system and method facilitate effectively inspecting cargo containers using a Megavolt CT scanning system to automatically detect contraband and to distinguish the atomic number of materials.

Exemplary embodiments of a system and method for inspecting cargo are described above in detail. The system and method are not limited to the specific embodiments described herein, but rather, components of the system and/or steps of the method may be utilized independently and separately from other components and/or steps described herein. Further, the described system components and/or method steps can also be defined in, or used in combination with, other systems and/or methods, and are not limited to practice with only the system and method as described herein.

While the invention has been described in terms of various specific embodiments, those skilled in the art will recognize that the invention can be practiced with modification within the spirit and scope of the claims.

What is claimed is:

1. An X-ray computed tomography scanning system configured for inspecting an object for contraband, said X-ray computed tomography scanning system comprising:
    a base defining an axis;
    a frame movably coupled to said base, said frame movable with respect to said base in a direction parallel to the axis;
    a platform configured to support the object, said platform rotatably coupled to said frame, said platform movable with said frame and rotatable with respect to said frame about the axis;
    at least one X-ray source fixedly positioned with respect to said platform, said at least one X-ray source configured to transmit radiation through the object; and
    at least one X-ray detector fixedly positioned with respect to said platform, said at least one X-ray detector configured to detect the radiation transmitted through the object and generate a signal representative of the detected radiation.

2. An X-ray computed tomography scanning system in accordance with claim 1 wherein said at least one X-ray source is mounted to a first tower positioned with respect to said base.

3. An X-ray computed tomography scanning system in accordance with claim 2 wherein said at least one X-ray detector is mounted to a second tower positioned with respect to said base.

4. An X-ray computed tomography scanning system in accordance with claim 1 wherein said at least one X-ray source comprises a megavolt X-ray generator.

5. An X-ray computed tomography scanning system in accordance with claim 1 wherein said at least one X-ray source comprises an X-ray source configured to selectively emit radiation at at least one energy distribution.

6. An X-ray computed tomography scanning system in accordance with claim 1 wherein said at least one X-ray source comprises a first X-ray source configured to emit radiation at a first energy distribution and a second X-ray source configured to emit radiation at a second energy distribution different from the first energy distribution.

7. An X-ray computed tomography scanning system in accordance with claim 1 wherein said at least one X-ray detector comprises a plurality of X-ray detectors.

8. An X-ray computed tomography scanning system in accordance with claim 1 further comprising:
 a data collection system in signal communication with said at least one X-ray detector, said data collection system configured to receive the generated signals and produce an image of the object; and
 a processor operatively coupled to said data collection system, said processor configured to process the produced image for facilitating determining the material content of the object.

9. An X-ray computed tomography scanning system in accordance with claim 8 wherein said processor is configured to produce a map of at least one of a CT number, density and atomic number of the scanned object.

10. An X-ray computed tomography scanning system in accordance with claim 1 further comprising:
 at least one neutron and gamma-ray detector positioned with respect to said platform, said at least one neutron and gamma-ray detector configured to detect radiation produced by fission of a fissile material within the object and generate a signal representative of detected radiation;
 a data collection system operatively coupled to said at least one neutron and gamma-ray detector, said data collection system configured to receive the generated signal; and
 a processor operatively coupled to said data collection system, said processor comprising an algorithm for facilitating detecting a presence of fissile material.

11. An X-ray computed tomography scanning system in accordance with claim 10 wherein said at least one neutron and gamma-ray detector is configured to perform a passive scan of the object for facilitating detecting radioactive materials.

12. A method for inspecting a container for contraband, said method comprising:
 positioning the container on a platform configured to support the container, the platform rotatably coupled to a frame that is movably coupled to a base defining an axis, the frame movable with respect to the base in a direction parallel to the axis, and the platform movable with the frame and rotatable with respect to the frame about the axis;
 producing X-ray beams having at least one energy distribution and transmitting the X-ray beams through the container as the container rotates about the axis and moves in a direction parallel to the axis;
 detecting the X-ray beams transmitted through the container with an array of detectors to generate signals representative of the detected radiation; and
 processing the signals to produce images of the container and contents of the container to generate a map for the container including at least one of a CT number, a density and an atomic number corresponding to the contents within the container.

13. A method in accordance with claim 12 wherein producing X-ray beams further comprises fixedly positioning at least one X-ray source with respect to the platform, the at least one X-ray source configured to transmit radiation through the container.

14. A method in accordance with claim 12 further comprising selectively emitting radiation from the at least one X-ray source at at least one energy distribution.

15. A method in accordance with claim 12 further comprising emitting radiation from a first X-ray source of the at least one X-ray source at a first energy distribution and emitting radiation from a second X-ray source of the at least one X-ray source at a second energy distribution different from the first energy distribution.

16. A method in accordance with claim 12 wherein detecting the X-ray beams further comprises fixedly positioning at least one X-ray detector with respect to the platform, the at least one X-ray detector configured to detect the radiation transmitted through the container and generate a signal representative of the detected radiation.

17. A method in accordance with claim 12 further comprising analyzing the images to determine a type of material contained within the container, wherein the images are analyzed by at least one of an automatic process and a person.

18. A method for X-ray computed tomography scanning of a container supported on a platform for inspecting contents of the container, said method comprising:
 providing a base defining a first axis and a frame movably coupled to the base;
 moving the frame with respect to the base in a direction parallel to the first axis;
 rotating the platform coupled to the frame, the platform rotatable with respect to the frame about the first axis;
 emitting an X-ray beam from at least one X-ray source fixedly positioned with respect to the platform and transmitting the X-ray beam through the container; and
 detecting the transmitted X-ray beam by at least one X-ray detector fixedly positioned with respect to the platform.

19. A method in accordance with claim 18 further comprising:
 generating signals representative of the detected X-ray beam;
 transmitting the generated signals from the at least one X-ray detector to a data collection system in signal communication with the at least one X-ray detector, the data collection system configured to receive the generated signals;
 processing the signals to reconstruct at least one image of a CT number, a density and an atomic number of contents; and
 inferring from the at least one reconstructed image the contents.

20. A method in accordance with claim 18 further comprising:
 inducing fission of a fissile material contained within the container;
 detecting radiation produced by the fission with at least one neutron and gamma-ray detector positioned with respect to the platform, the at least one neutron and gamma-ray detector configured to generate a signal representative of detected radiation; and
 processing the detected radiation to facilitate detecting a presence of fissile material.

21. A method in accordance with claim 20 further comprising confirming a presence of fissile material using an algorithm for detecting fissile material.

22. A method in accordance with claim 20 further comprising passively scanning the container to facilitate detecting radioactive materials.

23. A method in accordance with claim 18 further comprising collecting data in a step-and-shoot mode.

24. An X-ray computed tomography scanning system comprising:
   a base defining an axis;
   a frame movably coupled to said base, said frame movable with respect to said base in a direction parallel to the axis;
   a platform configured to support the object, said platform rotatably coupled to said frame, said platform movable with said frame and rotatable with respect to said frame about the axis;
   at least one X-ray source positioned with respect to said platform, said at least one X-ray source configured to transmit radiation through the object and induce fission of a fissile material within the object;
   at least one neutron and gamma-ray detector positioned with respect to said platform, said at least one neutron and gamma-ray detector configured to detect radiation produced as a result of fission, said at least one neutron and gamma-ray detector configured to generate a signal representative of detected radiation; and
   a data collection system operatively coupled to said at least one neutron and gamma-ray detector, said data collection system configured to detect a presence of fissile material based at least partially on the generated signal.

25. An X-ray computed tomography scanning system comprising:
   a base defining an axis;
   a frame movably coupled to said base, said frame movable with respect to said base in a direction parallel to the axis;
   a platform configured to support the object, said platform rotatably coupled to said frame, said platform movable with said frame and rotatable with respect to said frame about the axis;
   at least one neutron and gamma-ray detector positioned with respect to said platform, said at least one neutron and gamma-ray detector configured to passively detect a presence of radioactive material, said at least one neutron and gamma-ray detector configured to generate a signal representative of detected radiation; and
   a data collection system operatively coupled to said at least one neutron and gamma-ray detector, said data collection system configured to detect a presence of radioactive material based at least partially on the generated signal.

26. An X-ray computed tomography scanning system in accordance with claim 25 wherein said platform is rotatable to facilitate data collection.

27. A high-energy, high throughput computed tomography (CT) scanning system configured for inspecting an object for contraband, said high-energy, high throughput CT scanning system comprising:
   a platform configured to support the object, said platform at least one of rotatable about an axis and movable in a direction parallel to the axis, said platform positionable in a plurality of step over positions to facilitate scanning at least a portion of the object;
   a high-energy radiation source fixedly positioned with respect to said platform, said high-energy radiation source configured to produce radiation that is transmitted through the object as the object rotates with said platform;
   an array of detectors fixedly positioned with respect to said platform, said array of detectors configured to measure radiation transmitted through the object and generate at least one signal representative of the detected radiation; and
   a processor configured to reconstruct a plurality of images in real time based at least partially on the at least one signal received from said array of detectors.

28. A high-energy, high throughput CT scanning system in accordance with claim 27 further comprising a conveyor operatively coupled to said platform to facilitate moving a plurality of objects through said high-energy CT scanning system.

29. A high-energy, high throughput CT scanning system in accordance with claim 27 further comprising localized shielding positioned about at least a portion of said high-energy CT scanning system.

30. A high-energy, high throughput CT scanning system in accordance with claim 27 wherein said high-energy radiation source produces X-ray radiation.

31. A high-energy, high throughput CT scanning system in accordance with claim 27 wherein said high-energy radiation source generates radiation having an energy distribution of at least about 1 MV.

32. A high-energy, high throughput CT scanning system in accordance with claim 27 wherein said high-energy radiation source comprises a multiple energy system.

33. A high-energy, high throughput CT scanning system in accordance with claim 27 wherein said high-energy CT scanning system is configured to at least one of automatically and by user inspection detect contraband within the object.

34. A high-energy, high throughput CT scanning system in accordance with claim 33 wherein, during detection by user inspection, said high-energy CT scanning system further configured to provide images for visually inspection of the object to facilitate on-screen resolution of detected contraband.

35. A high-energy, high throughput CT scanning system in accordance with claim 27 further comprising a subsystem comprising at least one of an array of neutron detectors and an array of gamma detectors, said subsystem configured to at least one of passively detect at least one of neutron radiation and gamma radiation emitted from the object and detect a result of an active interrogation of the object to confirm a presence of nuclear material within the object.

36. A high-energy, high throughput CT scanning system in accordance with claim 27 wherein said high-energy radiation source is configured to generate low energy X-rays and high energy X-rays in a high speed switching mode such that the object is scanned only one time to facilitate high throughput.

* * * * *